Patented Feb. 14, 1939

UNITED STATES PATENT OFFICE 2,147,154

PROCESS OF PRODUCING POLYMERIZATION PRODUCTS OF VINYL CHLORIDE

Hans Fikentscher, Ludwigshafen-on-the-Rhine, and Walter Franke, Heidelberg, Germany, assignors to I. G. Farbenindustrie Aktiengesellschaft, Frankfort-on-the-Main, Germany No Drawing. Application October 15, 1936, Serial No. 105,672. In Germany October 18, 1935

8 Claims. (Cl. 260—84)

The present invention relates to polymerization products of vinyl chloride and to a process of producing the same.

Polymerization products of vinyl chloride or mixtures of vinyl chloride with other polymerizable compounds frequently tend to discolor in light or at high temperatures and this impairs their capacity for being generally employed in industry.

We have now found that polymerization products of vinyl chloride which are specially stable to light and heat can be prepared by interpolymerizing vinyl chloride or mixtures of vinyl chloride with other compounds polymerizable under the reaction conditions on the one hand with unsaturated carboxylic acids or their amides in amounts of from 0.5 to 3 per cent on the other hand and after treating the resulting polymerization products with dilute solutions of alkalies or substances having a strongly alkaline reaction. As substances to be interpolymerized which increase the stability to light and heat may be mentioned acrylic acid and its homologues, as for example alpha-methacrylic acid, and also its substitution products, as for example alpha-chlor-acrylic acid, and also maleic acid, itaconic acid and all those unsaturated carboxylic acids and their amides which are capable of being interpolymerized with vinyl chloride.

As polymerizable compounds which instead of vinyl chloride alone may be employed according to our invention in admixture with vinyl chloride may be mentioned for example vinyl esters, acrylic acid esters, acrylic acid nitrile or styrene.

The polymerization may be carried out according to known methods, as for example in mass, in aqueous emulsion, in solution or in the presence of liquids which are capable of dissolving the monomeric substances but not of dissolving the polymerized compounds.

The aqueous emulsions or the solutions of the polymerization products obtained are adjusted to a pH value of from 7.5 to 12 by the addition of solutions of alkalies or of strongly alkaline substances, as for example solutions of caustic soda, ammonia or soda, or the polymerization products obtained by coagulating the aqueous emulsions are heated up to about 90° C. in the presence of aqueous solutions of the said alkaline reacting substances at a similar pH value and then freed from the excess of alkaline substances by washing. The aqueous emulsions treated in the aforesaid manner are specially stable; the solid products have a light stability of 300 hours or more when tested in a Fadeometer. When heated to from 150° to 160° C., a slight change in color towards brown takes place after from 15 to 20 minutes as contrasted with polymerization products prepared without the addition of the said carboxylic acids or their amides which are discolored deep brown or black under the same conditions. The products obtained may contain plasticizers, dyestuffs, pigment, fillers usual for plastic masses.

Since in the working up of thermoplastic masses high temperatures must frequently be used, it is now possible to render the said polymerization products available for the first time for a considerably wider field of employment on the ground of the increase in stability to light and heat obtainable according to this invention.

The following examples will further illustrate how the present invention may be carried out in practice but the invention is not restricted to these examples. The parts are by weight.

*Example 1*

33 parts of vinyl chloride are emulsified in 125 parts of water in a pressure-tight vessel with the aid of 1.5 parts of an emulsifying agent. After adding 1.2 parts of a peroxide as a catalyst the emulsion obtained is heated at about 50° C. for about 20 hours at a pH value of 3.5 with continuous thorough mixing while adding a mixture of 6.5 parts of acrylic acid iso-octyl ester and 0.5 part of acrylic acid in small portions. The emulsion obtained is adjusted to a pH value of 8 by the addition of ammonia. It is more stable than an emulsion of a polymerization product which does not contain the addition of acrylic acid. The emulsion may also be precipitated by the addition of an electrolyte. So much alkali is then added that the alkali content amounts to about 0.5 per cent. After heating to 80° C., the precipitate is centrifuged off and washed with distilled water until when made into a paste with water it has a pH value of from 7.5 to 8. The dried polymerization product contains 43.8 per cent of chlorine, corresponding to 77.1 per cent of vinyl chloride. When working up the polymerization product at high temperatures a considerably slighter discoloration takes place than in the case of a corresponding product which has been prepared without the addition of acrylic acid.

*Example 2*

27 parts of vinyl chloride are emulsified after the addition of 1.5 parts of an emulsifying agent in 120 parts of water at a pH value of 3.5 and polymerized at 50° C. during the course of 24 hours with the addition of 1.2 parts of peroxide as catalyst, a mixture of 2.35 parts of acrylic acid iso-octyl ester and 0.15 part of acrylic acid being added in portions in the course of the polymerization. After working up as in Example 1, a white loose powder is obtained having a chlorine content of 50.3 per cent, corresponding to a vinyl chloride content of about 89 per cent. By rolling the said product on a calendar heated to 160° C. a practically colorless thin foil is obtained while when using a corresponding product which contains no acrylic acid, a discoloration of the foil towards brown takes place.

Other acrylic esters, as for example acrylic methyl, ethyl or butyl esters, may be employed instead of the acrylic octyl ester.

*Example 3*

40 parts of vinyl chloride are emulsified in 150 parts of water as described in the foregoing examples and polymerized at 50° C. during the course of 36 hours with an addition of 0.2 part of acrylic acid. After precipitation, treatment with a 0.4 per cent solution of alkali at 90° C. centrifuging and washing, a white, loose powder is obtained which, after the addition of softening agents, has a considerably better stability to heat during the further working up on hot rollers than a corresponding product which has been prepared without the addition of acrylic acid. The stability to heat may be still further improved by adding 0.4 part of acrylic acid instead of 0.2 part.

Other unsaturated monocarboxylic or dicarboxylic acids, as for example methacrylic or maleic acid, may be used instead of acrylic acid.

*Example 4*

A mixture of 40 parts of vinyl chloride, 1.7 parts of emulsifying agent, 0.15 part of ammonium persulphate and 0.9 part of sodium pyrophosphate are emulsified with 150 parts of water in a pressure-tight vessel and polymerized at 50° C. with an addition of 0.4 part of methacrylic acid amide, care being taken for a good and thorough mixing of the reactants. The resulting emulsion is precipitated by the addition of an electrolyte. Such an amount of alkali is added to the precipitate that the content of the former is 0.4 per cent, the whole is heated to from 70° to 90° C. centrifuged and washed with pure water until a pH value of from 7.5 to 8 is obtained. After drying, a white, loose powder is obtained which is considerably more stable to heat than a corresponding product which has been prepared without the addition of methacrylic acid amide. Amides of other unsaturated carboxylic acids, as for example, acrylic acid amide, may be used instead of methacrylic acid amide.

What we claim is:

1. In the production of polymerization products of vinyl chloride the step which comprises interpolymerizing vinyl chloride with from 0.5 to 3 per cent of a substance selected from the group consisting of alpha-beta unsaturated carboxylic acids and their amides, aftertreating the resulting interpolymerization product with solutions of substances having a strongly alkaline reaction and adjusting the liquid medium containing the interpolymerization product to a pH value of from 7.5 to 12.

2. In the production of polymerization products of vinyl chloride the step which comprises interpolymerizing a mixture of vinyl chloride and at least one other compound polymerizable under the reaction conditions with from 0.5 to 3 per cent of a substance selected from the group consisting of alpha-beta unsaturated carboxylic acids and their amides, aftertreating the resulting interpolymerization product with solutions of substances having a strongly alkaline reaction and adjusting the liquid medium containing the interpolymerization product to a pH value of from 7.5 to 12.

3. In the production of polymerization products of vinyl chloride the step which comprises interpolymerizing a mixture of vinyl chloride and acrylic acid methyl ester with from 0.5 to 3 per cent of a substance selected from the group consisting of alpha-beta unsaturated carboxylic acids, their amides, and aftertreating the resulting interpolymerization product with solutions of substances having a strongly alkaline reaction and adjusting the liquid medium containing the interpolymerization product to a pH value of from 7.5 to 12.

4. In the production of polymerization products of vinyl chloride the step which comprises interpolymerizing vinyl chloride with from 0.5 to 3 per cent of acrylic acid, aftertreating the resulting interpolymerization product with solutions of substances having a strongly alkaline reaction and adjusting the liquid medium containing the interpolymerization product to a pH value of from 7.5 to 12.

5. In the production of polymerization products of vinyl chloride the step which comprises interpolymerizing vinyl chloride with from 0.5 to 3 per cent of methacrylic acid amide, aftertreating the resulting interpolymerization product with solutions of substances having a strongly alkaline reaction and adjusting the liquid medium containing the interpolymerization product to a pH value of from 7.5 to 12.

6. Aqueous emulsions of interpolymerization products of vinyl chloride and from 0.5 to 3 per cent of a substance selected from the group consisting of alpha-beta unsaturated carboxylic acids and their amides adjusted to a pH value of from 7.5 to 12.

7. Aqueous emulsions of interpolymerization products of vinyl chloride and from 0.5 to 3 per cent of acrylic acid adjusted to a pH value of from 7.5 to 12.

8. Aqueous emulsions of interpolymerization products of vinyl chloride and from 0.5 to 3 per cent of methacrylic acid amide adjusted to a pH value of from 7.5 to 12.

HANS FIKENTSCHER.
WALTER FRANKE.